Patented Apr. 15, 1969

3,438,723
METHOD OF PREPARING +2 VALENT METAL YTTRIUM AND RARE EARTH FERRITES
Maggio P. Pechini, Williamstown, Mass., assignor to Sprague Electric Company, North Adams, Mass., a corporation of Massachusetts
No Drawing. Continuation-in-part of application Ser. No. 304,434, Aug. 26, 1963. This application July 10, 1967, Ser. No. 652,001
Int. Cl. C22b 59/00
U.S. Cl. 23—22   5 Claims

ABSTRACT OF THE DISCLOSURE

The method of preparing ferrites comprising dissolving the oxide, alkoxide or alpha hydroxycarboxylate of iron in aqueous citric acid and dissolving in the resulting solution the oxide, hydroxide, carbonate or alkoxide of a +2 valency metal, yttrium or the rare earth metals. A resin forming portion of a polyhydroxy alcohol is then added and the solution heated to form a resin intermediate which is calcined to form the ferrite.

CROSS-REFERENCE TO RELATED APPLICATION

This application is a continuation-in-part of co-pending application Ser. No. 304,434 filed Aug. 26, 1963 now Patent 3,330,697.

Background of the invention

The present invention pertains to a method for the formation of ferrites.

The ferrites are classified as ceramic ferromagnetic compositions. One group has the subgeneric formula $$MO \cdot Fe_2O_3$$

wherein M is a divalent metal ion such as cadmium, copper, nickel, manganese, zinc, magnesium, cobalt, or mixtures thereof. During formation, the mixed oxides crystallize to the spinel structure, named after the mineral spinel, $Mg\,Al_2O_4$.

The preparation of ferrites requires considerable experience because of the numerous processing variables. It is only with a great deal of trial and error that more or less standard conditions can be approached. One prior art process includes the wet mixing of an appropriate metal oxide with $Fe_2O_3$. The mixing is carried out in a ball mill using kerosene or water with an appropriate wetting agent. This mixing technique is a constant source of impurities which alter the magnetic properties of the ferrite. The art has long sought a technique which would not involve this type of mixing.

SUMMARY OF THE INVENTION

It is an object of this invention to prepare ferrite powders.

It is a further object to prepare soft, hard and garnet ferrite powders.

It is another object to prepare mixed ferrite powders.

These and other objects and advantages will be apparent from the following description.

This invention relates to a process for preparing a ferrite composition comprising dissolving at least one member of the group consisting of the oxide, alkoxide and alpha hydroxycarboxylate of iron in an aqueous solution of citric acid. Dissolving therein at least one metal compound from the group consisting of the oxide, hydroxide, carbonate and alkoxide of a +2 valency metal, yttrium and the rare earth metals. Adding a resin forming proportion of a polyhydroxy alcohol to the solution. Heating the combination to evaporate excess solvent and form a resin intermediate. Calcining the resin to remove organic constituents and form the ferrite.

The process is directed to the formation of soft ferrites and hard ferrites. The essential difference between the two lies in their respective coercive forces. In soft ferrites it is small (<20 oersteds) and in hard ferrites it is large (>1,000 oersteds). The garnet ferrites are so-called because of the similarity in structure to the garnets.

DETAILED DESCRIPTION OF THE INVENTION

EXAMPLE I

Preparation of a spinel ferrite powder

To prepare the iron solution used to form the ferrites, sufficient quantity of hydrated ferric oxide to yield 30 grams of $Fe_2O_3$ is added to 1,000 ml. of $H_2O$ containing 160 grams of citric acid. Heat the combination to effect solution. Filter to remove any insolubles. A portion of the solution is assayed to determine the equivalent in $Fe_2O_3$ in grams/ml. The approximate concentration will be 0.03 gram of $Fe_2O_3$ per ml. The weight ratio of Fe to citric acid is about 1:2.

To prepare the manganese ferrite solution used to form $MnO \cdot Fe_2O_3$, the stoichiometric equivalent of $MnCO_3$ is added to a measured volume of the above solution. 2.159 grams of $MnCO_3$ is slowly added to 100 mls. of the above solution which contains 3.000 grams of $Fe_2O_3$. Heat is applied to hasten solution and expel $CO_2$. The solution is cooled to room temperature and the volume adjusted to 100 ml. with water. This solution will yield approximately 0.0433 gram of $MnO \cdot Fe_2O_3$ per ml. The solution is assayed to determine the exact value. To convert this to $MnO \cdot Fe_2O_3$, about 15 ml. of glycol is added and the solution is heated in an open container to remove excess solvent until a solid resin intermediate is formed. The resin intermediate is calcined at about 450° C. to form $MnO \cdot Fe_2O_3$. X-ray diffraction shows this material to be a single phase.

To prepare nickel, cadmium, copper, zinc, magnesium, and cobalt ferrite solutions, the process is repeated using the appropriate carbonate in equivalent amounts.

For the preparation of mixed ferrites, combine appropriate volumes of selected $MO \cdot Fe_2O_3$ solutions. For each 100 mls. of combined solution about 15 mls. of glycol is added. Upon evaporation, the resin intermediate is formed. The resin is calcined at about 450° C. and the residue is the ferrite powder. For example, an appropriate combination will yield $Mn_{.55}Zn_{.45}Fe_2O_4$.

To prepare a hexagonal ferrite material, as distinguished from the cubic material of the preceding examples, employ $BaCO_3$, PbO or $SrCO_3$ in proportions to yield a material having the formula $MO \cdot 6Fe_2O_3$ wherein M is Ba, Pb or Sr. This material is known as a hard ferrite.

To prepare a garnet ferrite material, $Y_2O_3$ or other suitable rare earth oxide is employed in a proportion to yield $3Y_2O_3 \cdot 5Fe_2O_3$.

The preferred alkoxides contemplated are the $C_1$–$C_8$ alkoxides. The preferred alpha hydroxycarboxylates are the citrates, lactates and glycolates.

In order to sinter the ferrite powder of the present invention to a usable ferrite of any desired shape or form any of the prior art techniques can be employed.

It should be understood that many modifications and changes can be made without departing from the spirit and scope of the invention and that the invention is to be limited only by the scope of the appended claims.

What is claimed is:

1. The process of preparing a ferrite composition comprising dissolving at least one member of the group consisting of the oxide, alkoxide and alpha hydroxycarboxylate of iron in an aqueous solution of citric acid; dissolving therein at least one metal compound from the group consisting of the oxide, hydroxide, carbonate and alkoxide of a +2 valency metal, yttrium and the rare earth metals; subjecting this solution to heat; adding a resin forming porportion of a polyhydroxy alcohol to the solution; heating to evaporate excess solvent and form the resin intermediate; and calcining the resin to remove organic constituents and form the ferrite.

2. The process of claim 1 wherein the iron compound is $Fe_2O_3 \cdot x\ H_2O$ and the weight ratio of Fe to citric acid is about 1:2; the +2 valency metal is at least one metal from the group consisting of zinc, manganese, nickel, cobalt, copper, cadmium, and magnesium; and the polyhydroxy alcohol is glycol.

3. The process of claim 1 wherein the iron compound is $Fe_2O_3 \cdot x\ H_2O$; the +2 valency metal is at least one metal from the group consisting of barium, lead and strontium, and the polyhydroxy alcohol is glycol.

4. The process of claim 1 wherein the iron compound is $Fe_2O_3 \cdot x\ H_2O$; the metal compound is selected from the group consisting of the oxide, hydroxide, carbonate and alkoxide of yttrium and the rare earth metals; and the polyhydroxy alcohol is glycol.

5. The process of claim 2 wherein the +2 valency metal is manganese.

References Cited
UNITED STATES PATENTS

| | | | |
|---|---|---|---|
| 3,049,404 | 8/1962 | Wade | 23—50 |
| 3,079,240 | 2/1963 | Remeika | 23—51 X |
| 3,129,184 | 4/1964 | Kenney et al. | 23—50 X |
| 3,131,082 | 4/1964 | Gambino | 23—51 X |
| 3,330,697 | 7/1967 | Pechini. | |

HERBERT T. CARTER, *Primary Examiner.*

U.S. Cl. X.R.

23—51, 23